United States Patent
Ivan et al.

(10) Patent No.: US 12,348,106 B2
(45) Date of Patent: Jul. 1, 2025

(54) SYSTEM FOR REDUCING BEARING CURRENTS IN AN ELECTRIC MACHINE

(71) Applicant: GM GLOBAL TECHNOLOGY OPERATIONS LLC, Detroit, MI (US)

(72) Inventors: William T. Ivan, Shelby Township, MI (US); Alireza Fatemi, Canton, MI (US); Rajeev Vyas, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 304 days.

(21) Appl. No.: 17/991,954

(22) Filed: Nov. 22, 2022

(65) Prior Publication Data

US 2024/0171034 A1 May 23, 2024

(51) Int. Cl.
  *H02K 5/173* (2006.01)
  *F16C 19/18* (2006.01)
  *H02K 7/08* (2006.01)
  *H02K 11/02* (2016.01)

(52) U.S. Cl.
  CPC ........... *H02K 5/1732* (2013.01); *F16C 19/18* (2013.01); *H02K 7/083* (2013.01); *H02K 11/02* (2013.01); *F16C 2380/26* (2013.01)

(58) Field of Classification Search
  CPC ...... H02K 5/1732; H02K 7/083; H02K 11/02; H02K 11/0141; F16C 19/18; F16C 2380/26; F16C 2202/42; F16C 19/04; F16C 19/52
  See application file for complete search history.

(56) References Cited

U.S. PATENT DOCUMENTS

| 5,572,078 A * | 11/1996 | Saichi ............... H02K 5/173 310/90 |
| 8,975,798 B1 * | 3/2015 | Larive ............. H02K 11/028 310/90 |

* cited by examiner

*Primary Examiner* — Thomas Truong (57) ABSTRACT

An electric machine including a stator, a rotor within the stator, and a shaft to which the rotor is mounted. The shaft extends through the stator. A first bearing and a second bearing support the shaft within the stator to allow the shaft and the rotor to rotate within the stator. The rotor is between the first bearing and the second bearing. A first magnetic core is at the shaft between the rotor and the first bearing. The first magnetic core is configured to suppress a bearing current flowing across the shaft, the first bearing, and the second bearing.

20 Claims, 5 Drawing Sheets

SYSTEM FOR REDUCING BEARING CURRENTS IN AN ELECTRIC MACHINE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system for reducing bearing currents in an electric machine.

When operated as a motor and/or generator, an electric machine may experience undesirable recirculating currents flowing through bearings supporting a rotor shaft. The currents, known as bearing currents, circulate from one side of the rotor shaft, through a first shaft bearing, through a motor/generator frame, through a second shaft bearing, and back to the rotor shaft, and vice-versa. The present disclosure relates to a system for reducing such bearing currents in an electric machine.

SUMMARY

In a feature, an electric machine includes a stator, a rotor within the stator, and a shaft to which the rotor is mounted. The shaft extends through the stator. A first bearing and a second bearing support the shaft within the stator to allow the shaft and the rotor to rotate within the stator. The rotor is between the first bearing and the second bearing. A first magnetic core is at the shaft between the rotor and the first bearing. The first magnetic core is configured to suppress a bearing current flowing across the shaft, the first bearing, and the second bearing.

In other features, the electric machine is operable as a motor and a generator.

In other features, the first magnetic core is mounted to the shaft such that the first magnetic core rotates with the shaft.

In other features, the first magnetic core is mounted independent of the shaft such that the first magnetic core is stationary as the shaft rotates.

In other features, the first magnetic core is mounted to a housing of the electric machine.

In other features, the shaft extends through the first magnetic core.

In other features, the first magnetic core has an annular shape, and the shaft extends through an aperture defined at a center of the first magnetic core.

In other features, the first magnetic core extends around less than an entirety of the shaft.

In other features, the first magnetic core has windings thereon.

In other features, the first magnetic core includes a powder ferrite material metal.

In other features, the first magnetic core includes a nanocrystalline alloy.

In other features, the first magnetic core is closer to the first bearing than the rotor.

In other features, a second magnetic core is at the shaft between the rotor and the second bearing, the second magnetic core configured to suppress the bearing current.

In a feature, an electric machine includes a stator, a rotor within the stator, and a shaft to which the rotor is mounted. The shaft extends through the stator. A first bearing and a second bearing support the shaft within the stator to allow the shaft and the rotor to rotate within the stator. The rotor is between the first bearing and the second bearing. A first magnetic core is at the shaft between the rotor and the first bearing. The first magnetic core is configured to suppress a bearing current flowing across the shaft, the first bearing, and the second bearing. A first electromagnetic interference (EMI) shield is between the first magnetic core and end windings of the stator. A second magnetic core is at the shaft between the rotor and the second bearing. The second magnetic core is configured to suppress the bearing current. A second EMI shield is between the second magnetic core and the end windings of the stator. The electric machine is operable as a motor and a generator.

In other features, the first magnetic core and the second magnetic core are mounted to the shaft such that the first magnetic core and the second magnetic core rotate with the shaft.

In other features, the first magnetic core and the second magnetic core are mounted independent of the shaft such that the first magnetic core and the second magnetic core are stationary as the shaft rotates.

In other features, the rotor extends through both the first magnetic core and the second magnetic core.

In other features, the first EMI shield is mounted to the first magnetic core over a first insulator. The second EMI shield is mounted to the second magnetic core over a second insulator.

In a feature, an electric machine includes the following: a stator including end windings extending axially outward at opposite axial ends of the stator; a rotor within the stator; a shaft to which the rotor is mounted, the shaft extending through the stator; a first bearing and a second bearing supporting the shaft within the stator to allow the shaft and the rotor to rotate within the stator, the rotor is between the first bearing and the second bearing; a first magnetic core at the shaft between the rotor and the first bearing, the first magnetic core is closer to the first bearing than the rotor, is surrounded by the end windings of the stator, and is configured to suppress a bearing current flowing across the shaft, the first bearing, and the second bearing; a first electromagnetic interference (EMI) shield between the first magnetic core and end windings of the stator; a second magnetic core at the shaft between the rotor and the second bearing, the second magnetic core is closer to the second bearing than the rotor, is surrounded by the end windings of the stator, and is configured to suppress the bearing current; and a second EMI shield between the second magnetic core and the end windings of the stator. The electric machine is operable as a motor and a generator.

In other features, the first magnetic core and the second magnetic core each define an aperture through which the shaft extends.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
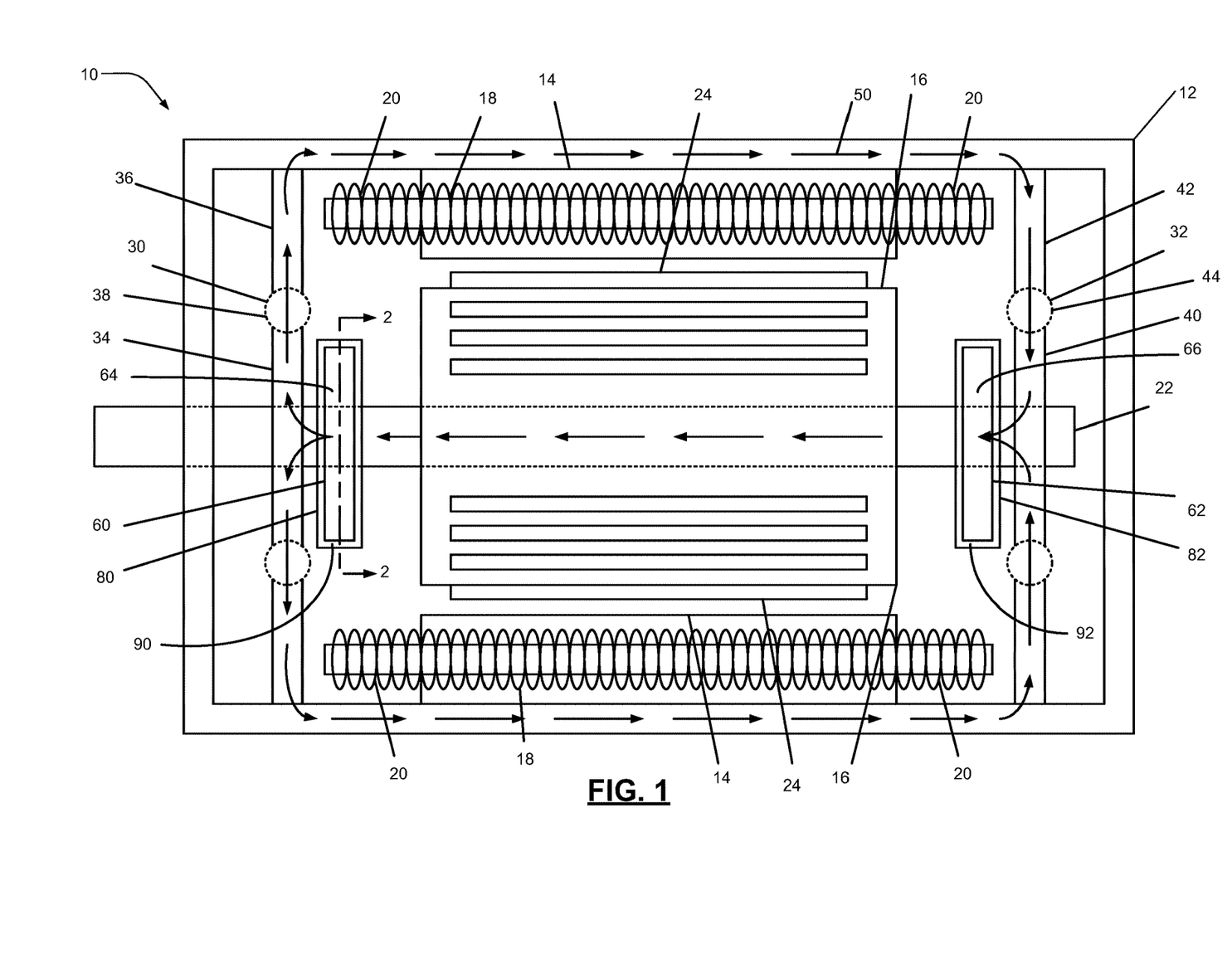
FIG. 1 illustrates an exemplary electric machine in accordance with the present disclosure.

FIG. 1 illustrates an exemplary electric machine 10 in accordance with the present disclosure. The electric machine 10 converts electrical energy into mechanical energy, or mechanical energy into electrical energy. The electric machine 10 can be configured to operate as an electric motor and/or electric generator. More specifically, the electric machine 10 may be configured as a motor for driving wheels of any suitable vehicle using power from a battery system. The electric machine 10 may be configured as a generator during regeneration to supply power to the battery system. The electric machine 10 may also be configured for use in any suitable non-vehicular application.

The electric machine 10 includes a housing 12. The housing 12 is typically made of conductive material, such as aluminum, steel, or any other suitable conductive material. The housing 12 may alternatively be made of any suitable non-conductive material. A stator 14 is mounted in the housing 12, and held stationary by the housing 12. The stator 14 has an annular shape. The stator 14 typically includes a ferromagnetic iron core with conductive windings 18 thereon. End windings 20 may extend axially outward at opposite axial ends of the stator 14.

A rotor 16 is rotatably mounted within the stator 14 on a shaft 22. An air gap between the stator 14 and the rotor 16 allows the rotor 16 to rotate. The rotor 16 may include permanent magnets 24. When operated as a motor, the windings 18, 20 of the stator 14 generate rotating magnetic fields that magnetically bias the permanent magnets 24 of the rotor 16 to rotate the shaft 22. When operated as a generator, rotation of the rotor 16 and permanent magnets 24 within the stator 14 produces electrical current through the windings 18, 20 of the stator 14.

The shaft 22 is mounted to a first bearing 30 and a second bearing 32, which allow the shaft 22 to rotate within the housing 12, and prevent the shaft from axially shifting. The first bearing 30 and the second bearing 32 are illustrated as rolling-element bearings, but any other suitable bearings may be used. The first bearing 30 includes an inner race 34, an outer race 36, and a plurality of rolling-elements 38 therebetween. The second bearing 32 includes an inner race 40, an outer race 42, and a plurality of rolling-elements 44 therebetween. The shaft 22 is seated in the inner race 34 of the first bearing 30 and in the inner race 40 of the second bearing 32. The outer race 36 of the first bearing 30 and the outer race 42 of the second bearing 32 are connected directly or indirectly to the housing 12. In some applications, the first bearing 30 or the second bearing 32 may be replaced with a bushing.

During operation, the electric machine 10 may, under certain conditions, have bearing current 50 flowing therethrough. For example, the bearing current 50 may flow when an induced voltage on the shaft 22 is high enough to overcome a breakdown voltage of lubricant (greater than 50V, for example) in the first and second bearings 30, 32. The bearing current 50 circulates from one side of the shaft 22 through the first bearing 30, through the housing 12 across the stator 14, back through the second bearing 32, and then back to the shaft 22. In applications where the housing 12 is made of a nonconductive material, or the stator 14 is isolated from the housing 12, the bearing current 50 may flow across the magnetic field generated by the stator 14. The bearing current 50 may undesirably cause the first and second bearings 30, 32 to wear prematurely.

The electric machine 10 further includes a first current suppressor 60 and a second current suppressor 62 configured to suppress the bearing current 50. The first and second current suppressors 60, 62 are mounted on or adjacent to the shaft 22, as described herein. The first current suppressor 60 and the second current suppressor 62 may be any suitable material, assembly, and/or device configured to suppress the bearing current 50 across the shaft 22, the first bearing 30 (or bushing), and the second bearing 32 (or bushing). For example, the first current suppressor 60 may include a first magnetic core 64, and the second current suppressor 62 may include a second magnetic core 66, which may be mounted on or adjacent to the shaft 22. Although the electric machine 10 is illustrated as including both the first and second current suppressors 60, 62, in some applications only one of the first and second current suppressors 60, 62 may be used.

The magnetic cores 64, 66 may be made of any suitable material with high magnetic permeability. For example, the magnetic cores 64, 66 may be made of any suitable ferromagnetic metal, such as iron, or ferromagnetic compounds, such as ferrites. The ferrite material may be a powder ferrite material. The magnetic cores 64, 66 may also be nanocrystalline cores. For example, a nanocrystalline alloy of an iron-boron-silicon alloy (which may also include copper and neodymium) may be used. As another example, the magnetic cores 64, 66 may be laminated magnetic cores made of stacks of thin iron sheets coated with an insulating layer. The sheets may be oriented horizontally or vertically relative to the shaft 22. The first and second magnetic cores 64, 66 may rotate with the shaft 22 and be mounted directly to the shaft 22, such as with an adhesive, press-fit, splined connection, etc. Or, the first and second magnetic cores 64, 66 may be mounted independent of the shaft 22 such that the magnetic cores 64, 66 remain stationary as the shaft 22 rotates within the magnetic cores 64, 66, as explained herein.

Figure 2:
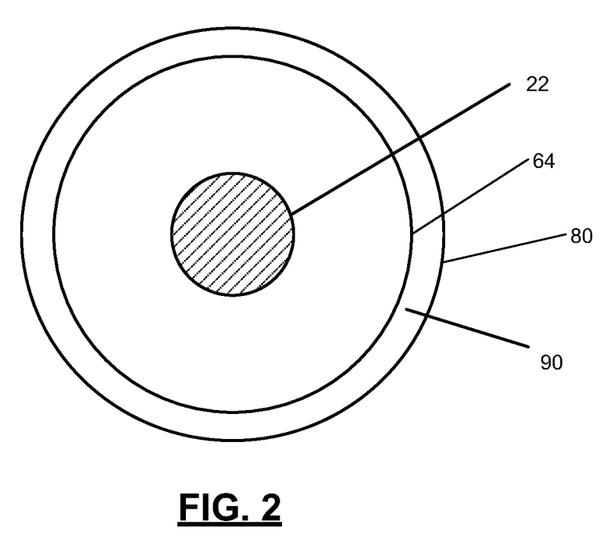
FIG. 2 is a cross-sectional view taken along line 2-2 of FIG. 1.

The first and second magnetic cores 64, 66 may have any suitable shape and size. For example, FIG. 2 illustrates the first magnetic core 64 having an annular shape with the shaft 22 extending therethrough. The second magnetic core 66 may be annular as well, and mounted so that the shaft 22 extends through the second magnetic core 66. The first and second magnetic cores 64, 66 may be mounted directly to the shaft 22 so that the first and second magnetic cores 64, 66 rotate with the shaft 22, as illustrated in the example of FIGS. 1 and 2. The first and second magnetic cores 64, 66 may be mounted directly to the shaft 22 in any suitable manner, such as with a suitable adhesive, a press-fit, or a splined connection. In applications where the first and second magnetic cores are mounted directly to the shaft 22 and have a non-circular shape (such as square, c-shaped, triangular, etc.), the shaft 22 may be counterbalanced to avoid any possible imbalance issues. The first and second magnetic cores 64, 66 may have any suitable size regardless of the size of the shaft 22. In general, relatively larger cores 64, 66 will be more effective at suppressing the bearing current 50 than relatively smaller cores 64, 66.

Figure 3:
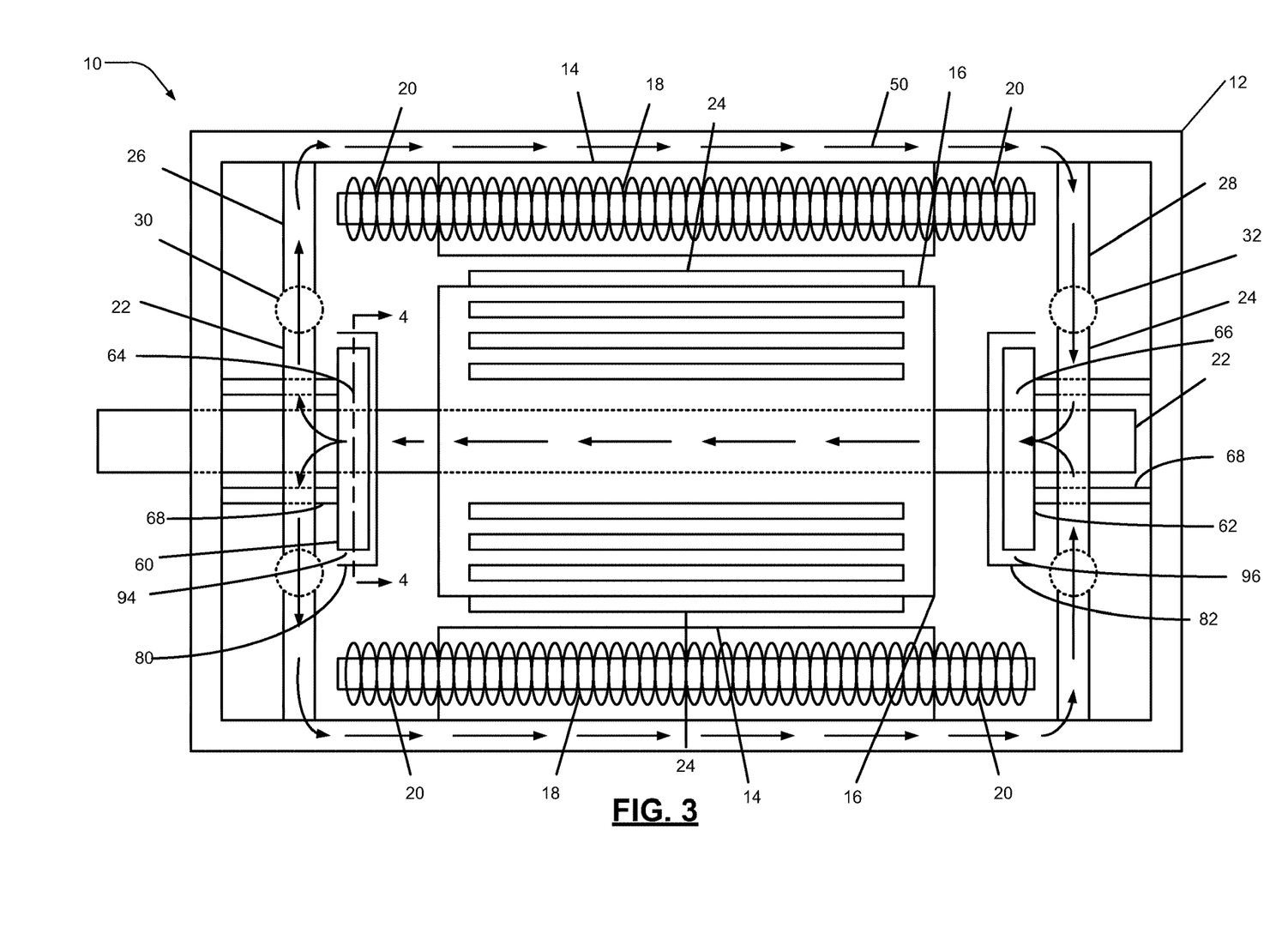
FIG. 3 illustrates another exemplary electric machine in accordance with the present disclosure.
Figure 4:
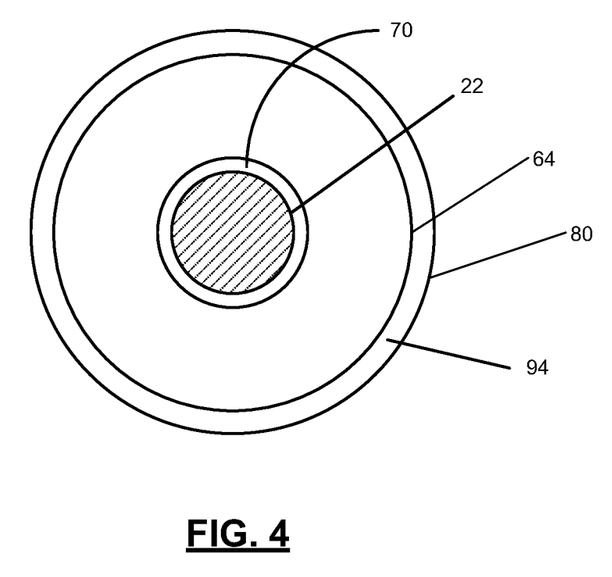
FIG. 4 is a cross-sectional view taken along line 4-4 of FIG. 3.

In some applications, the first and second magnetic cores 64, 66 may be mounted independent of the shaft 22 so that the magnetic cores 64, 66 remain stationary as the shaft 22 rotates. The first and second magnetic cores 64, 66 may be mounted independent of the shaft in any suitable manner. For example and as illustrated in FIG. 3, the first and second magnetic cores 64, 66 may be mounted to the housing 12 by supports 68. The supports 68 may be made of any suitable material, and may be conductive or non-conductive. The first and second magnetic cores 64, 66 are mounted so that a gap is defined between the shaft 22 and the magnetic cores 64, 66, which allows the shaft 22 to rotate independent of the magnetic cores 64, 66. For example and as illustrated in FIG. 4, the first magnetic core 64 may have an annular shape and be mounted to the housing 12 by way of the supports 68 so that a gap 70 is defined between the shaft 22 and the first magnetic core 64. The second magnetic core 66 may be mounted with the supports 68 in the same manner.

Figure 5:
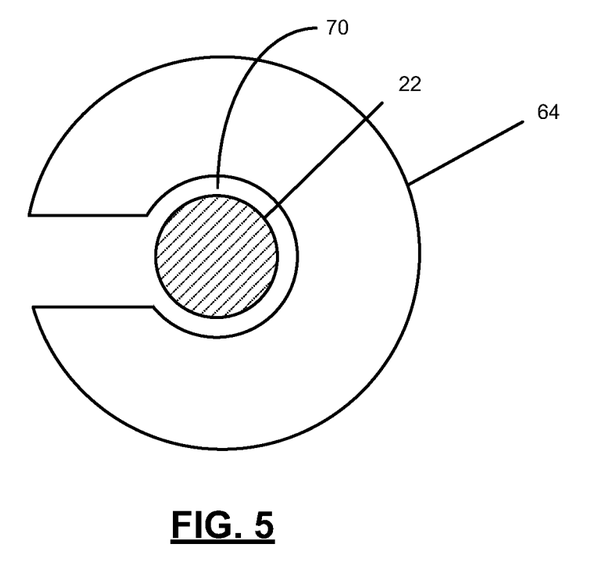
FIG. 5 is a cross-sectional view of an exemplary magnetic core in accordance with the present disclosure for suppressing bearing currents.

The first and the second magnetic cores 64, 66 may alternatively be c-shaped. For example, FIG. 5 illustrates the first magnetic core 64 with a c-shape such that the core 64 does not extend entirely around the shaft 22. In the example of FIG. 5, the core 64 is mounted independent of the shaft 22, such as by way of the supports 68, to define a gap 70 between the shaft 22 and the c-shaped core 64. In other applications, the first and second magnetic cores 64, 66 may be c-shaped and mounted directly to the shaft 22, such as with a suitable adhesive.

Figure 6:
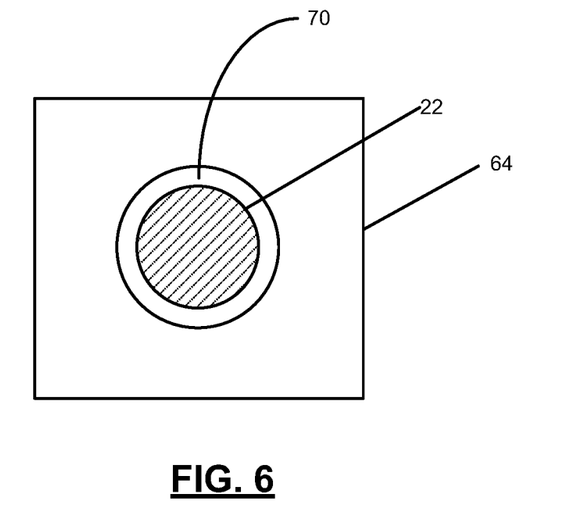
FIG. 6 is a cross-sectional view of another exemplary magnetic core in accordance with the present disclosure.

The first and the second magnetic cores 64, 66 may also be square shaped. For example, FIG. 6 illustrates the magnetic core 64 with an overall outer square shape. In the example of FIG. 6, the core 64 is mounted independent of the shaft 22, such as by way of the supports 68, to define a gap 70 between the shaft 22 and the square core 64. In other applications, the first and second magnetic cores 64, 66 may be square and mounted directly to the shaft 22, such as with a suitable adhesive.

The first and second magnetic cores 64, 66 may have any other suitable shape regardless of whether the cores 64, 66 are mounted directly to the shaft 22 or independent of the shaft 22. For example, the first and second cores 64, 66 may be triangular, toroidal, hexagonal, pentagonal, etc.

As illustrated in FIGS. 1 and 3, the first magnetic core 64 is arranged on or around the shaft 22 between the rotor 16 and the first bearing 30. The second magnetic core 66 is arranged on or around the shaft 22 between the rotor 16 and the second bearing 32. To increase the effectiveness of the first and second magnetic cores 64, 66 at suppressing the bearing current 50, the first and second magnetic cores 64, 66 are mounted as close as possible to the first and second bearings 30, 32 respectively. The present disclosure is not limited to one or two of the first and second magnetic cores 64, 66. For example, the present disclosure may include more than one magnetic core about the shaft 22 between the first bearing 30 and the rotor 16, and more than one magnetic core about the shaft 22 between the second bearing 32 and the rotor 16. The multiple magnetic cores may be arranged either side-by-side along the shaft 22, or stacked.

The first and second magnetic cores 64, 66 are in series with the bearing current 50, and thus the bearing current 50 passes through the magnetic cores 64, 66. The first and second magnetic cores 64, 66 increase the impedance of the shaft 22 to suppress the bearing current 50. The magnetic cores 64, 66 may reduce the bearing current 50 by as much as 95%, for example. Reducing the bearing current 50 reduces fluting and/or pitting of the first and second bearings 30, 32 caused by the bearing current 50.

Figure 7:
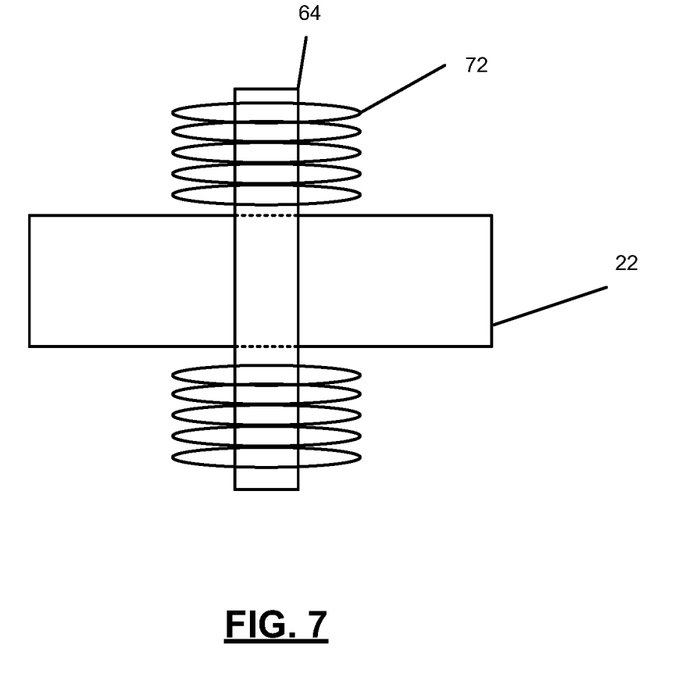
FIG. 7 illustrates an additional exemplary magnetic core in accordance with the present disclosure.

The bearing current 50 may have a specific resonant frequency based on the overall design geometry of the electric machine 10. The resonant frequency varies across different motor designs. To tailor the effectiveness of the first and second magnetic cores 64, 66 to reduce the resonant frequency of a particular motor design, the cores 64, 66 may include windings for impedance shaping. For example and as illustrated in FIG. 7, the first magnetic core 64 may have windings 72 wrapped around the core 64. The second magnetic core 66 may include the windings 72 as well. The windings 72 may be arranged as a closed loop with opposite ends of the windings 72 connected to each other. Alternately, the windings 72 may be open at opposite ends, resistor terminated, or Zener diode terminated, for example. The windings 72 may be positioned in any suitable manner, and any suitable number of windings 72 may be included, to tailor the magnetic fields of the first and second magnetic cores 64, 66 to most effectively suppress the bearing current 50 of the electric machine 10 or any other motor.

To reduce saturation of the first and second magnetic cores 64, 66 from magnetic fields generated by stator windings 18, and particularly the end windings 20, first and second electromagnetic interference (EMI) shields 80, 82 may be included. The first and second EMI shields 80, 82 may also be positioned to shield the first and second cores 64, 66 from the magnets 24 of the rotor 16. As illustrated in FIGS. 1 and 2, the first EMI shield 80 shields the first magnetic core 64 from saturation, and the second EMI shield 82 shields the second magnetic core 66 from saturation. The first and second EMI shields 80, 82 may extend around radially outer surfaces and axial side surfaces of the first and second magnetic cores 64, 66, or only on the radial outer surfaces. The first and second EMI shields 80, 82 may be made of any suitable electromagnetic shielding material. For example, the first and second EMI shields 80, 82 may be made of steel, brass, aluminum, copper, beryllium, etc.

In the example of FIGS. 1 and 2, the first EMI shield 80 is mounted to the first magnetic core 64 with a first insulator 90 therebetween. The second EMI shield 82 is mounted to the second magnetic core 66 with a second insulator 92 therebetween. The first and second EMI shields 80, 82 may be press-fit onto the first and second magnetic cores 64, 66 over the first and second insulators 90, 92 respectively, or secured in place with any suitable adhesive. Thus, in the example of FIGS. 1 and 2, the first and second EMI shields 80, 82 rotate with the shaft 22 and the first and second magnetic cores 64, 66.

In the example of FIG. 3, the first and the second EMI shields 80, 82 are mounted to the shaft 22 to rotate with the shaft 22. The first and second EMI shields 80, 82 may be mounted to the shaft 22 in any suitable manner, such as with an adhesive or press fit. The first and second EMI shields 80, 82 are spaced apart from the first and second magnetic cores 64, 66 respectively to define gaps 94 and 96 therebetween. The gaps 94, 96 may be filled with an insulator, but an insulator is not required because the EMI shields 80, 82 are not mounted to the cores 64, 66. In the example of FIG. 3, the first and second EMI shields 80, 82 do not extend entirely around the first and second magnetic cores 64, 66, and are only arranged on sides of the cores 64, 66 facing the rotor 16 and the stator end windings 20.

In addition to the examples illustrated in FIGS. 1-4, the first and second EMI shields 80, 82 may be mounted in any other suitable manner. For example, the first and second EMI shields 80, 82 may be mounted to the housing 12 with supports similar to the supports 68. Further, the first and second EMI shields 80, 82 may be arranged only on sides of the first and second magnetic cores 64, 66 facing the end windings 20 of the stator 14. Still further, the first and second EMI shields 80, 82 may be mounted (by way of the first and second insulators 90, 92) to the first and second magnetic cores 64, 66 of FIG. 3, which are spaced apart from the shaft 22 and remain stationary as the shaft 22 rotates.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. An electric machine comprising:
a stator;
a rotor within the stator;
a shaft to which the rotor is mounted, the shaft extending through the stator;
a first bearing and a second bearing supporting the shaft within the stator to allow the shaft and the rotor to rotate within the stator, the rotor is between the first bearing and the second bearing;
a first magnetic core at the shaft between the rotor and the first bearing, the first magnetic core configured to suppress a bearing current flowing across the shaft, the first bearing, and the second bearing; and
an electromagnetic interference (EMI) shield between the first magnetic core and end windings of the stator.

2. The electric machine of claim 1, wherein the electric machine is operable as a motor and a generator.

3. The electric machine of claim 1, wherein the first magnetic core is mounted to the shaft such that the first magnetic core rotates with the shaft.

4. The electric machine of claim 1, wherein the first magnetic core is mounted independent of the shaft such that the first magnetic core is stationary as the shaft rotates.

5. The electric machine of claim 4, wherein the first magnetic core is mounted to a housing of the electric machine.

6. The electric machine of claim 1, wherein the shaft extends through the first magnetic core.

7. The electric machine of claim 1, wherein the first magnetic core has an annular shape, and the shaft extends through an aperture defined at a center of the first magnetic core.

8. The electric machine of claim 1, wherein the first magnetic core extends around less than an entirety of the shaft.

9. The electric machine of claim 1, wherein the first magnetic core has windings thereon.

10. The electric machine of claim 1, wherein the first magnetic core includes a powder ferrite material metal.

11. The electric machine of claim 1, wherein the first magnetic core includes a nanocrystalline alloy.

12. The electric machine of claim 1, wherein the first magnetic core is closer to the first bearing than the rotor.

13. The electric machine of claim 1, further comprising a second magnetic core at the shaft between the rotor and the second bearing, the second magnetic core configured to suppress the bearing current.

14. An electric machine comprising:
a stator;
a rotor within the stator;
a shaft to which the rotor is mounted, the shaft extending through the stator;
a first bearing and a second bearing supporting the shaft within the stator to allow the shaft and the rotor to rotate within the stator, the rotor is between the first bearing and the second bearing;
a first magnetic core at the shaft between the rotor and the first bearing, the first magnetic core configured to suppress a bearing current flowing across the shaft, the first bearing, and the second bearing;
a first electromagnetic interference (EMI) shield between the first magnetic core and end windings of the stator;
a second magnetic core at the shaft between the rotor and the second bearing, the second magnetic core configured to suppress the bearing current; and
a second EMI shield between the second magnetic core and the end windings of the stator;
wherein the electric machine is operable as a motor and a generator.

15. The electric machine of claim 14, wherein the first magnetic core and the second magnetic core are mounted to the shaft such that the first magnetic core and the second magnetic core rotate with the shaft.

16. The electric machine of claim 14, wherein the first magnetic core and the second magnetic core are mounted independent of the shaft such that the first magnetic core and the second magnetic core are stationary as the shaft rotates.

17. The electric machine of claim 14, wherein the rotor extends through both the first magnetic core and the second magnetic core.

18. The electric machine of claim 14, wherein the first EMI shield is mounted to the first magnetic core over a first insulator; and wherein the second EMI shield is mounted to the second magnetic core over a second insulator.

19. An electric machine comprising:
a stator including end windings extending axially outward at opposite axial ends of the stator;
a rotor within the stator;
a shaft to which the rotor is mounted, the shaft extending through the stator;
a first bearing and a second bearing supporting the shaft within the stator to allow the shaft and the rotor to rotate within the stator, the rotor is between the first bearing and the second bearing;
a first magnetic core at the shaft between the rotor and the first bearing, the first magnetic core is closer to the first bearing than the rotor, is surrounded by the end windings of the stator, and is configured to suppress a bearing current flowing across the shaft, the first bearing, and the second bearing;
a first electromagnetic interference (EMI) shield between the first magnetic core and end windings of the stator;
a second magnetic core at the shaft between the rotor and the second bearing, the second magnetic core is closer to the second bearing than the rotor, is surrounded by the end windings of the stator, and is configured to suppress the bearing current; and
a second EMI shield between the second magnetic core and the end windings of the stator;
wherein the electric machine is operable as a motor and a generator.

20. The electric machine of claim 19, wherein the first magnetic core and the second magnetic core each define an aperture through which the shaft extends.

* * * * *